Feb. 21, 1956 J. H. GRAHAME 2,735,449
PIPE SPACING DEVICE
Filed Dec. 23, 1952

INVENTOR.
JAMES H. GRAHAME
BY
Henry M. Chapin
ATTORNEY

United States Patent Office 2,735,449
Patented Feb. 21, 1956

2,735,449

PIPE SPACING DEVICE

James H. Grahame, Mount Vernon, N. Y., assignor to The Texas Company, New York, N. Y., a corporation of Delaware Application December 23, 1952, Serial No. 327,625

9 Claims. (Cl. 138—65)

My invention relates to improvements on the pipe spacing device shown in U. S. Patent Re. 23,545, wherein a series of longitudinally extending parallel blocks are connected together and positioned around an inner pipe to support it in spaced relation within a surrounding casing.

While devices constructed according to that patent have been generally satisfactory it has heretofore been necessary to construct them with a plurality of longitudinally spaced connecting cables for the spacer blocks in order to guard against twisting of the blocks during insertion of the pipe into a casing. Such a construction obviously is considerably more expensive and complicated than if a single connecting cable could be used.

In accordance with the present invention there is provided an improved pipe spacing device wherein a plurality of longitudinally spaced pipe spacer blocks are connected together in a string by suitable elongated flexible connecting means, and the string is positioned around a pipe with the bases of the blocks contiguous to one another. Thus, when a lateral force is applied to any spacer block, it is braced by the adjoining blocks and twisting is avoided.

My novel braced construction makes it possible to use but a single connecting cable for most purposes. However, it is apparent that the principles of the invention also may be employed to brace pipe spacing devices using a plurality of connecting cables.

The invention will be described in detail below with reference to the drawings, in which.

Figure 5:
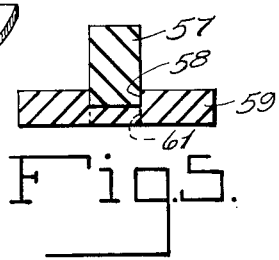
Figure 6:
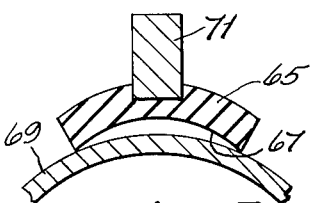
Figure 4:
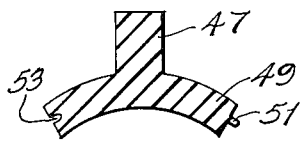
Figure 7:
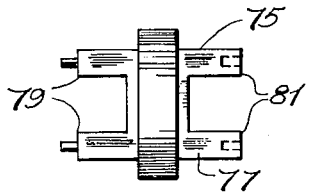

Figs. 4, 5, and 6 are cross-sectional views showing three types of pipe spacer blocks in accordance with the invention; and Fig. 7 is a plan view of still another type of pipe spacer block.

Figure 1:
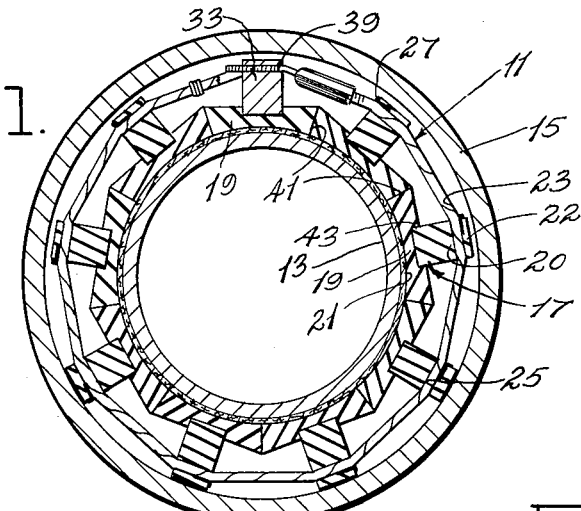
Fig. 1 is a cross-sectional view, parts being in elevation, showing the pipe spacing device of the invention in position on a pipe that is located within a casing.
Figure 2:
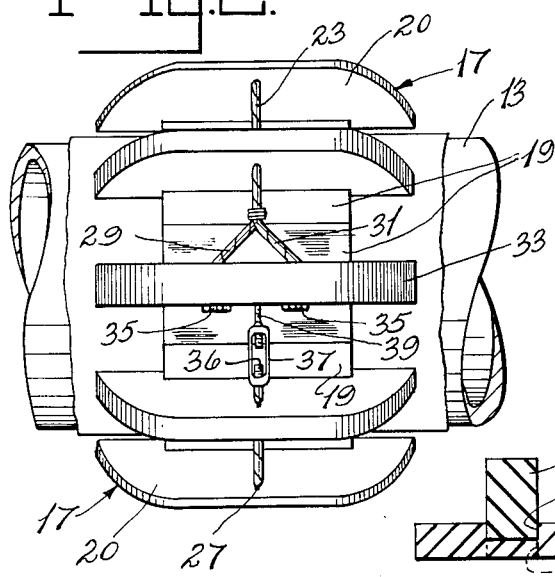
Fig. 2 is a plan view showing the pipe spacing device in position on a pipe.

Referring to Figs. 1 and 2, my novel pipe spacing device 11 is shown in position around a pipe 13 which is spaced within a casing 15. Pipe spacing device 11 comprises a series of longitudinally extending parallel T-shaped spacer blocks 17 having relatively wide bases 19 contiguous at their lateral edges and provided with concave inner surfaces 21 resting on the outside surface of the pipe, and relatively narrow stems 20 projecting outwardly and having outer surfaces 22 adapted to be positioned adjacent the inner surface of casing 15.

The several spacer blocks 17 are connected together as a string by elongated flexible connecting means such as a single steel cable 23 which is threaded through a series of centrally located transverse holes 25 in the stems 20 so spaced from the outer surfaces 22 as to be out of contact with casing 15. The several spacer blocks 20 are fixed to cable 23 by wedge pins 27 or any other suitable means, with the spacing between blocks being so correlated with the circumference of the pipe 13 that the lateral edges of the bases 19 are contiguous to one another when the device 11 is positioned around the pipe so as to brace the blocks against twisting on the cable as the pipe is inserted into casing 15. When wedge pins 27 are not used, the blocks are free to slide on cable 23, but the device can still be used effectively if the operator carefully positions the several blocks next to one another on the pipe.

After positioning the device 11 about the pipe 13, the ends of cable 23 are coupled together and the cable is tightened to hold the spacer blocks firmly in position. In the embodiment of the invention shown in Figs. 1–3 of the drawings one end of cable 23 comprises a pair of forks 29 and 31 which project through a pair of transverse bores equally spaced on opposite sides of the center of spacer block 33. Forks 29 and 31 are secured in block 33 in any suitable way, as by cap nuts 35 threaded over the ends of the forks. The opposite end 36 of cable 23 is connected to block 33 by a turnbuckle 37 which is threaded on both the end 36 and on a stud bolt 39 projecting centrally from block 33. The threading is such that rotating turnbuckle 37 in one direction draws the ends of the cable 23 closer together, and turning it in the opposite direction moves the ends away from one another.

Usually pipe spacing devices of the type described are employed for preventing electrolytic corrosion of the pipe 13 and casing 15, as will occur if the two are in contact with one another. For this reason the pipe spacer blocks should be constructed all, or in part, of a mechanically strong electrically insulating material having low moisture absorption characteristics. Among suitable materials are hard rubber and phenolic condensation products such as Bakelite type resins.

Figure 3:
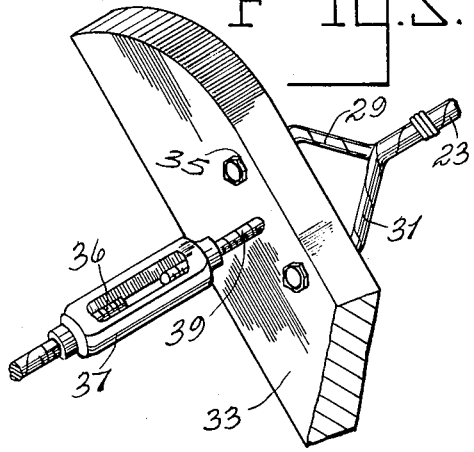
Fig. 3 is an enlarged perspective view showing the coupling mechanism of the pipe spacing device of Figs. 1 and 2.

Various designs of pipe spacer blocks are shown in the drawings. In Figs. 1–3 all of the blocks 17 comprise bases 19 of electrically insulating material having inner surfaces 21 curved to fit the pipe 13, and having inwardly bevelled lateral edges 41 adapted to engage the adjoining similarly shaped bases. Bases 19 have longitudinally extending slots 43 within which the separate stems 20 and 33 fit tightly. Since stems 20 and 33 are longer than bases 19 they project at both ends beyond the ends of the bases; and the projecting portions are spaced from the pipe 13. All of the projecting stems 20 have tapered ends to facilitate insertion into a casing.

Stems 20 are made of the same material as the bases, except for the top stem 33 which advantageously may be made of metal to withstand the strain of coupling the cable ends together. Metal stem 33 is insulated from pipe 13 by its base 19, and in service it is spaced from casing 15.

In the embodiment shown in Fig. 4, a stem 47 and base 49 are constructed as a unitary structure. A longitudinal tongue 51 projects from one lateral edge of base 49 and the opposite edge is provided with a longitudinal groove 53, for engaging a corresponding groove and tongue, respectively, in adjoining similar spacer blocks to connect the blocks together and guard against shifting on a pipe.

As shown in Fig. 5 a stem 57 fits in groove 58 in base 59, and at its opposite ends where it projects beyond base 59 has downwardly extending portions 61 which rest on the pipe surface. Both top and bottom surfaces of base 59 are flat in this modification.

As shown in Fig. 6, a base 65 of resilient material has a bottom surface 67 which is concavely curved with a radius of curvature less than that of the pipe 69 to which it is to be applied. When pressure is applied by tightening the connecting cable, base 65 is pressed down to fit the pipe snugly. This construction is advantageous when stem 71 is of metal or other material harder than base 65, which might apply sufficient pressure to the base to force its edges up away from the pipe if it were not for the severe curvature of surface 67.

Fig. 7 shows a spacer block 75 having a base 77 comprising male and female bifurcations 79 and 81 adapted to engage mating members of the immediately adjoining spacer blocks. With this construction adequate bracing is secured while eliminating a substantial part of the bulk of the block, which reduces the cost and improves the ease of handling.

Obviously, many modifications and variations of the invention as hereinabove set forth, may be made without departing from the spirit and scope thereof, and therefore only such limitations should be imposed as are indicated in the appended claims.

I claim:

1. A pipe spacing device comprising a series of T-shaped pipe spacer blocks comprising relatively wide bases having inner surfaces adapted to rest on the outside surface of a pipe, and relatively narrow stems projecting outwardly from said bases and having outer surfaces adapted to be positioned adjacent the internal surface of a casing; connecting means passing transversely of said blocks intermediate said inner and outer surfaces and connecting said blocks together as a string of blocks adapted to be positioned around said pipe, said string having ends adapted to be coupled together, said blocks being adapted to be spaced from one another in said string in such correlation with the circumference of said pipe that when said string is positioned around said pipe said bases are contiguous to one another so as to brace said blocks against twisting on said connecting means; and means for coupling together said ends of said string when positioned around said pipe.

2. A pipe spacing device in accordance with claim 1, also comprising means cooperating with both said blocks and said connecting means for retaining said blocks in predetermined spaced relationship on said connecting means.

3. A pipe spacing device in accordance with claim 1 wherein said connecting means comprises a single elongated flexible member extending transversely through said stems.

4. A pipe spacing device in accordance with claim 1 wherein said inner surface of said base is concave with a radius less than that of such pipe.

5. A pipe spacing device in accordance with claim 1 wherein said bases have adjoining lateral edges, said device also comprising means connecting together said adjoining lateral edges.

6. A pipe spacing device in accordance with claim 5 wherein said bases are bifurcated.

7. In combination, a pipe; a series of T-shaped pipe spacer blocks arranged circumferentially around said pipe, said blocks having relatively wide bases resting on the outside surface of said pipe and having side edges contiguous to one another to brace said blocks against twisting on said pipe, said spacer blocks also having narrow stems projecting outwardly from said bases in spaced relation to one another; and connecting means passing transversely of said blocks intermediate the inner and outer surfaces thereof connecting said blocks together circumferentially of said pipe for securing said blocks in position thereon.

8. A pipe spacing device comprising a series of T-shaped pipe spacer blocks comprising relatively wide bases having inner surfaces adapted to rest on the outside of a pipe, and relatively narrow stems projecting outwardly from said bases and having outer surfaces adapted to be positioned adjacent the internal surface of a casing; a single connecting cable passing transversely of said blocks intermediate said inner and outer surfaces and connecting said blocks together as a string of blocks adapted to be positioned around said pipe, said cable comprising forks at one end thereof secured to one of said blocks on opposite sides of the center thereof, and the opposite end of said cable being removably and replaceably connectable to said last-named block centrally thereof whereby when said cable and said blocks are secured to a pipe the forces are evenly distributed on said last-named block; said blocks being spaced from one another in said string in such correlation with the circumference of said pipe that when said string is positioned around said pipe said bases are contiguous to one another so as to brace said blocks against twisting.

9. An improved pipe spacer block for a pipe spacing device, said pipe spacer block being a T-shaped member of electrically insulating material comprising a relatively wide base having a channel therein and a separate relatively narrow stem fitting within said channel and projecting outwardly from said base, said stem having a single bore transversely therethrough for receiving a connector member.

References Cited in the file of this patent

UNITED STATES PATENTS

| 1,516,838 | Arnold et al. | Nov. 25, 1924 |
| 2,551,867 | Bond | May 8, 1951 |